US005270101A

United States Patent [19]

Helicher

[11] Patent Number: 5,270,101

[45] Date of Patent: Dec. 14, 1993

[54] COLLECTABLE PROMOTIONAL CARD

[76] Inventor: Leonard Helicher, 4313 18th Ave., Brooklyn, N.Y. 11218

[21] Appl. No.: 884,150

[22] Filed: May 18, 1992

[51] Int. Cl.[5] .................. B32B 9/00

[52] U.S. Cl. .................. 428/209; 428/76; 428/187; 428/192; 428/195; 428/205; 206/232

[58] Field of Search .................. 428/76, 457, 192, 195, 428/205, 209, 463, 187; 206/232; 229/92.8

[56] References Cited

U.S. PATENT DOCUMENTS 5,120,589 6/1992 Morikawa et al. .................. 428/76

*Primary Examiner*—Patrick J. Ryan
*Assistant Examiner*—Abraham Bahta
*Attorney, Agent, or Firm*—Bauer & Schaffer

[57] ABSTRACT

A collectable card having enhanced tone and depth quality having a reflective supporting member, a photographic image disposed on a transparent laminate. The photographic image is mounted on the reflective metallic surface of precious metal. A semi-transparent image enhancing layer is disposed between the supporting member and the image preventing the reflective surface from being visible through the photographic image.

12 Claims, 1 Drawing Sheet

COLLECTABLE PROMOTIONAL CARD

FIELD OF THE INVENTION

The present invention relates to collectable cards and in particular, to a sports card, such as a baseball card, having an intrinsic value, as well as the ephemeral value placed thereon by the collector.

BACKGROUND OF THE INVENTION

Items such as promotional and collectable cards are used in many fields and typically comprise cards of celebrities and athletes.

An example of such an item is the baseball card. For many years, baseball cards have been available featuring a photograph or illustration of a professional player along with limited personal data such as his name and team on the front side of the card, and extensive personal and professional data on the reverse side of the card. Similar cards for other sports, such as basketball and football, are also available. Collecting and trading such cards has become a popular activity among sports fans. What had been for many years been a hobby has now become a relatively serious business in buying and selling cards. Some of these cards have become quite valuable because of their rarity or the acquired fame of the player depicted on the card. The value of rare cards has become increasingly high.

Conventional collector cards comprise images, and/or text printed directly on paper substrates by conventional printing methods. However, due to constraints in the printing process, the image quality produced is less than desirable. In the typical manner of production, printing yields grainy, low resolution images. Thus, the image quality generally obtainable is of far lower quality than available with conventional photographic paper. Conventional printing technology permits the transfer of an image through the transfer of multi-colored dyes to a paper substrate. The dyes are absorbed on contact into the paper surface leaving an image having a grainy appearance. Thus, the resolution embodied in the original image is lost, and a low quality reproduction is obtained.

Moreover, collector cards while highly priced and frequently very expensive, have no intrinsic or real value, nor are they permanent or long-lasting without a great deal of care.

It is, therefore, an object of the present invention to provide collector cards having improved resolution of image and text thereby providing individual collectable cards of greater beauty and of enhanced design.

It is a further object to provide collector cards having enhanced intrinsic value and, in particular, providing the enhanced value by replacing the paper substrate with a precious metal substrate.

It is still another object to provide a collector card of enhanced beauty and value on which the image and text is printed on clear plastic film which film is laminated on precious metal substrate.

SUMMARY OF THE INVENTION

In accordance with the present invention an improved collectable card is provided comprising a flat, reflective metal substrate, an image bearing film member mounted over the reflective core, and a protective member covering the image layers.

A semi-transparent image enhancing layer may be disposed between the photographic image and the metal substrate. Preferably, the image enhancing layer is sufficiently opaque to prevent the color of the substrate from being viewed through the image or text on the bearing film member, but sufficiently translucent to allow the color to enhance and surround the image and text.

As a result of the above combination of elements, the collectable card of the present invention possesses superior image quality as compared to a conventional card, as well as a high intrinsic value. The present invention permits this result by permitting incident light to pass through the image applied to the film member and reflect back through the image off the surface of the metal substrate supporting member.

The invention accordingly comprises the features of the construction, combination of elements and arrangement of components which will be exemplified in the preferred embodiments hereinafter set forth and in the accompanying drawings, and the scope of the invention will be indicated in the claims.

DETAILED DESCRIPTION OF THE PREFERRED EMBODIMENTS

Figure 1:
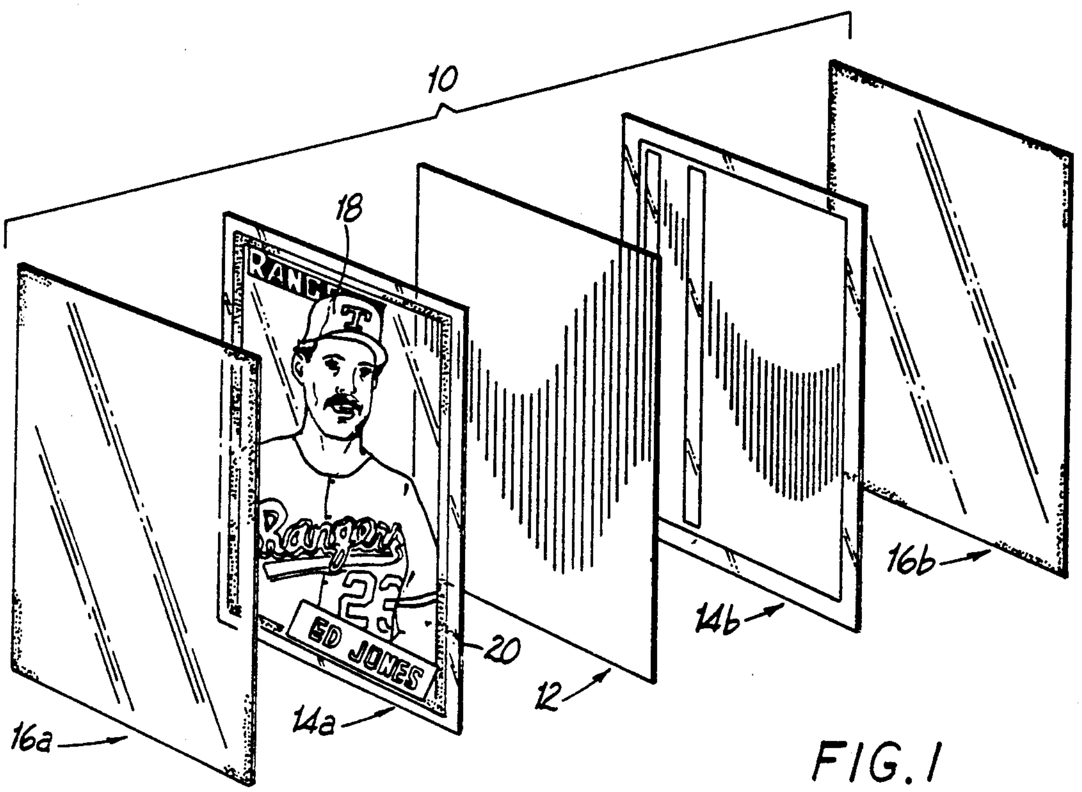
FIG. 1 is an exploded frontal view of a preferred embodiment of the present invention, an enhanced image collectable card.

Referring to FIG. 1, there is illustrated a baseball card embodying the teachings of the present invention. The card, generally identified by reference numeral 10, comprises several elements assembled in laminae form, i.e., a central supporting member, denoted by reference numeral 12; an image bearing transparency member **14*a* and 14*b* located over the front face and the rear face, respectively of the supporting member; and a transparent protective layer 16*a* and 16*b***.

The supporting member 12 is formed of a thin, flexible sheet of a reflective precious metal, such as gold, silver, platinum or other precious metals. In addition, the supporting member is relatively stiff, has shape retaining characteristics, and a polished, reflective surface.

The frontal image bearing transparency **14*a* overlying the front face of the supporting member 12 comprises a positive image 18 applied to the rear surface of a transparent film 20. The positive image 18 and film may be formed of the processed emulsion of a positive photographic film, i.e., a slide transparency, or the image 18 may comprise the emulsion of a photographic printing paper which has been removed from the paper backing. In addition, the image 18** may be printed directly onto the rear surface of a transparent material. The positive image is preferably of a person, a scene or the like of the type commonly known as "sports cards".

Preferably, a semi-transparent image enhancing layer 22 is placed over the image 18 or interposed between the image 18 and the supporting member 12. The image enhancing layer 22 preferably comprises a thin, uniform layer of white, reflective material which is, most desirably, directly applied to the rear surface of the film 20 behind the positive image 18 only. The image enhancing layer 22 acts to enhance the brilliance and the contrast of the colors in the image 18. Since the image may be provided as applied to a film in the form of a processed emulsion, which may have been removed from backing layers of a photographic film or paper, it is highly transmissive. Therefore, the image enhancing layer 22 provides a backing layer for the image which serves to disperse light that is transmitted through the image itself. The image enhancing layer 22 scatters the light throughout the image to enhance the brilliance and, in addition, to increase the reflectivity of the image.

The supporting member 12 and the image enhancing layer 16 cooperate to provide a back-lighting effect, increasing the tone and contrast of the image and making the image stand out. While the image enhancing layer 22 provides a reflective background for the photographic image, it is an important aspect that the image enhancing layer 22 is not an opaque film. Rather, the image enhancing layer 16 must be a semi-transparent layer which permits a significant degree of light to be transmitted therethrough.

The rear image film 14*b* is formed identically to the front image film 14*a*, except that it contains mostly written material 24 such as biographical and explanatory information regarding the image on the front. As such the rear image film does not require a semi-opaque backing layer.

The image bearing transparencies 14*a* and 14*b* with or without the image enhancing layer 22 deposited thereon are overlaid on the supporting member 12 and are sandwiched together and sealed with the protective outer members 16*a* and 16*b* which comprise a pair of transparent laminates disposed on opposite surfaces of the assembled structure. The individual laminates of the protecting member extend somewhat beyond the perimeter of the center support 12 and the transparencies 14*a* and 14*b* such that the laminates may be sealed together about their outer edge. By using such a structure, the image bearing member 14 and enhancing layer 16 need not be adhered to the supporting member, thereby avoiding delamination problems.

Although the figures illustrate the case of a supporting member 12 formed entirely of a reflective metal sheet, this example is not intended to be a limitation on the scope of the invention. It should be appreciated that the supporting member 12 may be formed of any reflective stiff opaque material which is sufficient to support the transparencies and which have a desirable precious metallic surface having desirable light reflectivity. Another example of a supporting member may be a supporting layer of a flexible synthetic fibrous material, or paper, having a reflective surface applied thereon, as by applying a thin film of metal to the supporting layer or the metal may be coated thereon by vacuum deposition or other known methods.

Figure 2:
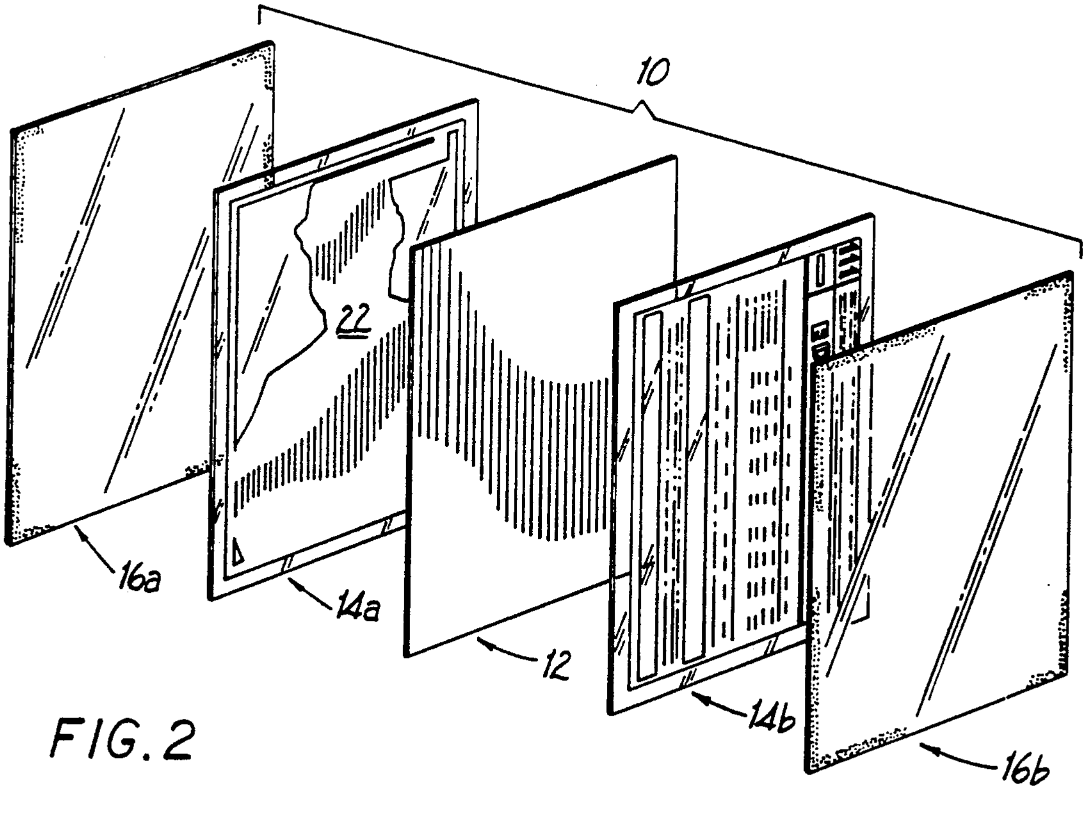
FIG. 2 is an exploded rear view of the collectable card shown in FIG. 1.

In another aspect of the invention, safety measures can be taken to prevent counterfeiting, copying, or mutilation of the card, thereby obviating any gross reduction in its inherent value. This can be effected, as seen in FIG. 2, by applying to the inner surface of the rear film (i.e. the film bearing the written text) a small holograph or other miniature print, picture number or the like. As seen in the figures, it is preferred that this device be a miniature of the image borne on the front face of he card. Further, a bar code, magnetic media or the like can be applied to provide ease in identification and in presentation of a serial number.

Regardless of the specific embodiment, the positive image is a translucent image which is transposed against a reflective surface of the supporting member. The positive image may be directly printed on the transparent film material by photographic printing techniques or formed on a photosensitive layer of a photographic film or paper. In this case, for example, the photosensitive layer is adhered to a support layer by a transparent adhesive protecting layer. The positive image is disposed in a face to face relationship with the transparent film and a dye transferring solvent is introduced into the space between the processed photosensitive film and the transparent film, the solvent being capable of dissolving the coloring matter forming the image, and heating the solvent in the space by dielectric heating to dissolve the image and transfer it onto the surface of the substrate.

It will be seen from the foregoing that the enhanced images are produced by the printing of an image onto a transparent cellulosic film to form a transparency. The printed substrate is then transposed against a flexible, reflective metallic surface to provide means whereby light transmitted through the image is reflected back through the image and directed to the eye of the viewer. In addition to providing a means for reflection of transmitted light, the reflective surface also provides increased contrast for improving the tonal quality of the image which coupled with the intrinsic value of the metal support produces a highly prized and valuable product.

The above examples are intended only as illustrative and not exhaustive. Various changes and modifications of the present invention are disclosed herein and others will be obvious to those skilled in the art. For example, it is generally desirable to provide printed media as well as images on the transparent film. In addition, the degree of transmissiveness of the media may be varied in direct proportion to the thickness of the image or print. By increasing the transmissiveness of the image or print, the reflective surface of the supporting member may be made more visible. This is particularly desirable for printed media. When used with a reflective surface having a bright color, the color of the reflective surface can become a background for the printed image or media. The embodiment described above includes an image enhancing layer which prevents the reflective surface from becoming visible through the image. However, if desired, the image enhancing layer may be deposited only over the photographic image leaving the printed media uncovered. Thus, the reflective surface will be visible through the printed media and the reflective surface will appear as a background of the media.

In addition, rather than sealing the protective member around the other components, to encapsulate the entire structure, the image bearing member and image enhancing layer may be adhesively applied directly to the supporting member.

Accordingly, it is intended that the present disclosure be taken as illustrative of the present invention and not limiting thereof.

What is claimed is:

1. A decorative object comprising a laminar assembly of a metal plate having a reflective surface, a transparent film having an image applied to one surface thereof placed in opposition to said reflective surface and a semi-transparent layer interposed between said metal plate and transparent film whereby said semitransparent layer cooperates with said image to enhance the appearance of said image and prevent the reflective surface of said metallic plate from being visible through said image.

2. The decorative object according to claim 1 wherein said assembly is encased in a transparent protective cover.

3. The decorative object in accordance with claim 1, wherein said image is a photographic image through which light may pass.

4. The decorative object in accordance with claim 1, wherein said metallic plate is a precious metal.

5. The decorative object in accordance with claim 4, wherein the precious metal is slected from the group consisting of gold or silver and platinum.

6. The decorative object in accordance with claim 1, wherein said metallic plate comprises an opaque material having a reflective metallic surface disposed thereon.

7. The decorative object in accordance with claim 1, wherein said image bearing member comprises a transparent laminate having a photographic image disposed on a surface thereof.

8. The decorative object in accordance with claim 1, wherein said semi-transparent layer is light dispersing and has a reflectivity different than that of the metallic plate.

9. The decorative object in accordance with claim 8, wherein said semi-transparent layer is white.

10. The decorative object according to claim 1, wherein said transparent film is an image bearing photograph.

11. The decorative object according to claim 1, wherein said metallic plate comprises a thin foil.

12. The decorative object according to claim 1, wherein said image is at least in part translucent and in part opaque.

* * * * *